United States Patent [19]
Abraham

[11] Patent Number: 6,160,789
[45] Date of Patent: *Dec. 12, 2000

[54] OPTICAL DATA STORAGE DISC

[75] Inventor: Nigel Christopher Abraham, Newcastle-upon-Tyne, United Kingdom

[73] Assignee: 3dcd, L.L.C., Charlotsville, Va.

[*] Notice: This patent issued on a continued prosecution application filed under 37 CFR 1.53(d), and is subject to the twenty year patent term provisions of 35 U.S.C. 154(a)(2).

[21] Appl. No.: 09/142,886

[22] PCT Filed: Mar. 19, 1997

[86] PCT No.: PCT/GB97/00768

§ 371 Date: Oct. 26, 1998

§ 102(e) Date: Oct. 26, 1998

[87] PCT Pub. No.: WO97/35307

PCT Pub. Date: Sep. 25, 1997

[30] Foreign Application Priority Data

Mar. 19, 1996 [GB] United Kingdom .................. 9605729

[51] Int. Cl.[7] .................................. G11B 7/24; G11B 5/84
[52] U.S. Cl. ...................... 369/275.1; 369/274; 428/64.4
[58] Field of Search .............................. 369/275.1, 275.4, 369/274, 280, 285, 287, 103; 430/320, 321; 428/64.4, 64.1

[56] References Cited

U.S. PATENT DOCUMENTS

| | | | |
|---|---|---|---|
| 3,689,078 | 9/1972 | Ban | 369/273 |
| 4,967,286 | 10/1990 | Nomula et al. | 386/124 |
| 5,279,689 | 1/1994 | Shvartsman | 156/220 |
| 5,398,231 | 3/1995 | Shin et al. | 369/275.4 |
| 5,533,002 | 7/1996 | Abraham | 369/275.3 |
| 5,602,825 | 2/1997 | Sugaya et al. | 369/275.4 |
| 5,608,717 | 3/1997 | Ito et al. | 369/275.3 |
| 5,608,718 | 3/1997 | Schiewe | 369/275.4 |
| 5,748,607 | 5/1998 | Ohira et al. | 369/275.4 |
| 6,011,767 | 1/2000 | Abraham | 369/103 |

FOREIGN PATENT DOCUMENTS

| | | |
|---|---|---|
| 9418355 | 4/1995 | Germany . |
| 5054599 | 3/1993 | Japan . |
| 8194972 | 7/1996 | Japan . |
| 8273331 | 10/1996 | Japan . |
| 9308565 | 4/1993 | WIPO . |

*Primary Examiner*—Tan Dinh
*Attorney, Agent, or Firm*—Edwin D. Schindler

[57] ABSTRACT

An optical data storage disc having a first component disc formed over one side with a pattern of indentations defining digital data, the indented side of the first component disc being provided with a reflective coating, and a second component disc being bonded to the indented side of the first component disc. The second component disc carries a surface relief pattern having continuous variations in depth over a range of depths, and defining a holographic, or other optically variable, image.

24 Claims, 3 Drawing Sheets

OPTICAL DATA STORAGE DISC

BACKGROUND OF THE INVENTION

The present invention relates to an optical data storage disc.

Optical data storage discs, particularly compact discs (CD's or CD-ROM's), comprise a disc of transparent material formed over one side with a pattern of indentations (or "pits") defining digital data, and this indented side of the disc is provided with a thin coating of reflective material. The digital data is optically "read" from the opposite side of the disc.

In order to increase the density of the data stored on the disc, the indentations must be smaller and more closely packed. It has now been agreed by a major consortium that the thickness of the disc should be reduced in thickness from the usual 1.2 mm, to approximately 0.6 mm: this agreement is with a view to forming discs of very high data density, which require the reduced thickness in order that the indentations can be resolved and optically read. However, the strength and rigidity of the reduced-thickness disc then needs to be restored by adhering a reinforcing disc over its indented side.

We have previously developed techniques for applying holograms to conventional CD's and CD-ROM's, not only as a decoration but more importantly as a protection against counterfeiting. We have now devised techniques for providing high density optical data storage discs (e.g. DVD's— digital versatile discs) with holograms or other optically variable images.

SUMMARY OF THE INVENTION

In accordance with the present invention, there is provided an optical data storage disc which comprises a first component disc formed over one side with a pattern of indentations defining digital data, the indented side of the first component disc being provided with a reflective coating, and a second component disc bonded to said indented side of the first component disc, said second component disc carrying a surface relief pattern which defines a holographic or other optically variable image.

The surface relief pattern of the second component disc may be formed directly into that side of the second component disc which faces the first component disc. This surface of the second component disc is preferably provided with a reflective coating.

The surface relief pattern may instead be formed into the surface of a coating applied to one side of the second component disc, for example by embossing or by a casting method such as a photo-polymerization process. The coated surface may face towards or away from the first component disc: in the latter case, the coating is further coated with an outer, protective layer. In some cases, the side of the second component disc facing the first component disc may be formed with a second pattern of indentations defining digital data. The two patterns of digital data may be read from opposite sides of the disc: the outer surface of either or both component discs may be formed with a surface relief defining a hologram or other optically variable image, or coated with a layer which is embossed or otherwise formed with such a relief and then coated with a semi-reflective layer.

The first and second component discs are preferably formed by injection moulding, the digital data pattern(s) thus being moulded directly.

BRIEF DESCRIPTION OF THE DRAWING FIGURES

Embodiments of the present invention will now be described by way of example only and with reference to the accompanying drawings, in which.

DETAILED DESCRIPTION OF THE DRAWING AND PREFERRED EMBODIMENTS

Figure 1:
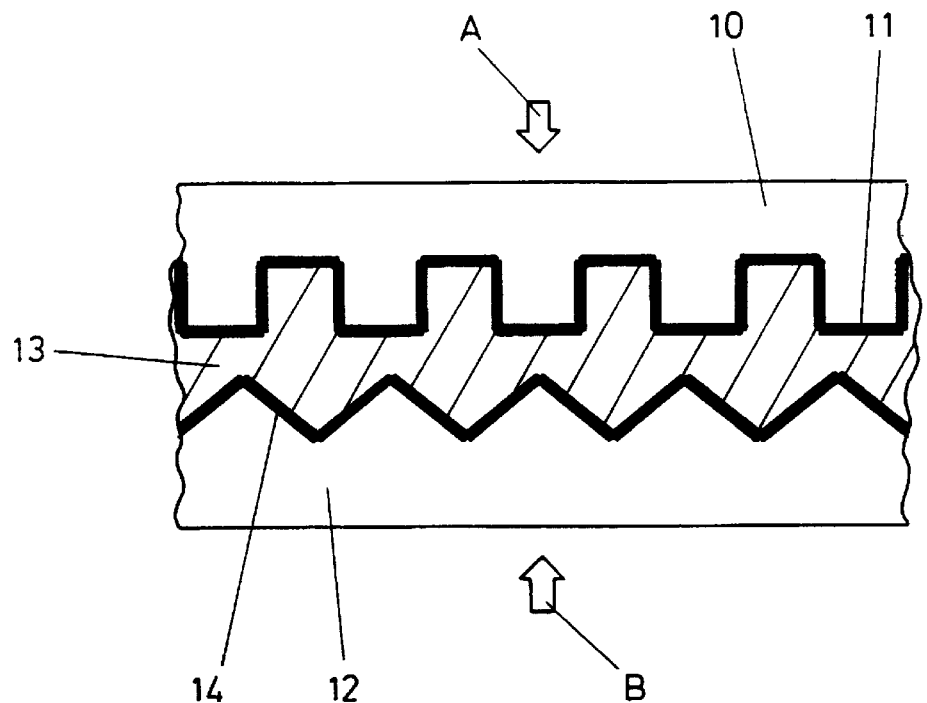
FIG. 1 is a schematic sectional view, enlarged but not to scale, of an optical data storage disc in accordance with the invention.

Referring to FIG. 1, there is shown an optical data storage disc which comprises a first component disc 10 formed by injection moulding from polycarbonate and having a pattern of indentations or "pits" in one side, defining digital data. This indented side is further provided with a reflective coating 11. The pattern of indentations is optically read by means of a light beam directed at the opposite side of the component disc 10 (in the direction of arrow A), and returned by reflection at the reflective coating 11. The component disc 10 is of reduced thickness, of the order of 0.6 mm: the indentations are of high density but the reduced thickness of the component disc 10 makes it easier for the indentations to be resolved and so optically read.

The optical data storage disc shown in FIG. 1 further comprises a second component disc 12 (also formed by injection moulding from polycarbonate) bonded to the indented side of the first component disc 10 by means of a layer 13 of adhesive or other bonding material. The second component disc 12 has a thickness of the order of 0.6 mm and imparts rigidity to the first component disc 10: component disc 12 is formed with a micro surface relief pattern over the side which is adhered to the first component disc 10, and this patterned side of disc 12 is provided with a reflective coating 14 which may be provided with a protective coating (not shown). The surface relief pattern is illustrated as having continuous variations in depth over a range of depths and defines a hologram or other optically variable image, and is viewed from the opposite side of the disc 12 (as indicated by arrow B).

Figure 2:
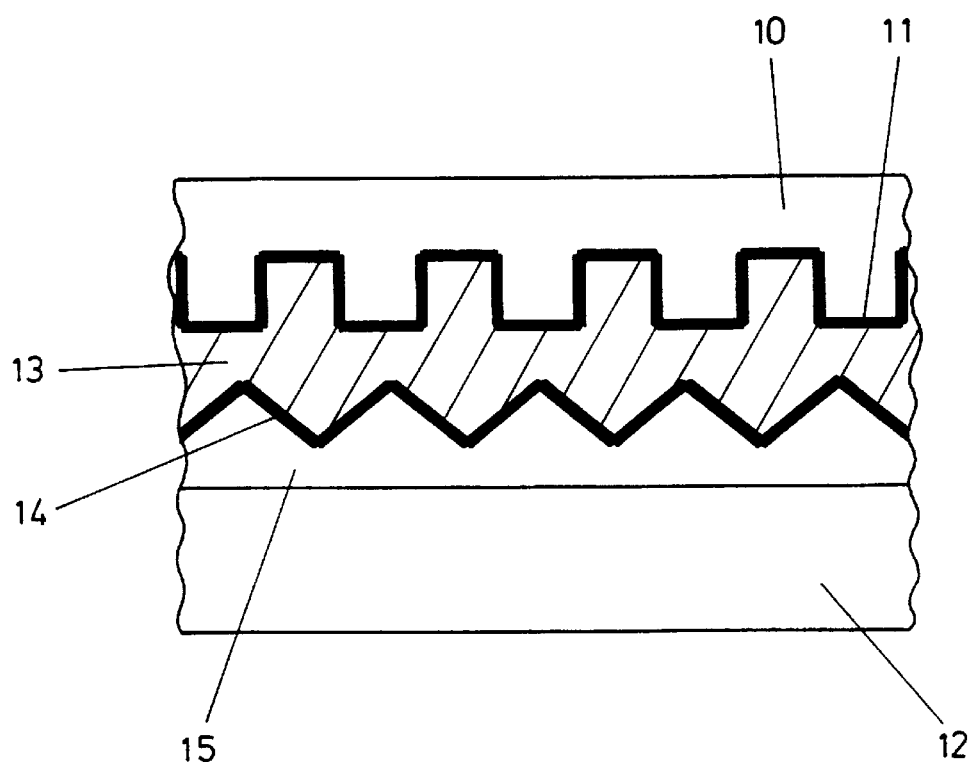
FIG. 2 is a similar view of a second optical data storage disc in accordance with the invention.

FIG. 2 shows an optical data storage disc which differs from that shown in FIG. 1 in that the micro surface relief pattern is embossed or otherwise formed into a lacquer coating 15 applied to a plane surface of the second component disc 12. A reflective coating 14 is then applied to the surface relief pattern before the component disc 12 is bonded to the first component disc 10 with its patterned coating facing the component disc 10. A further protective coating (not shown) may be applied to component disc 12 before bonding.

Figure 3:
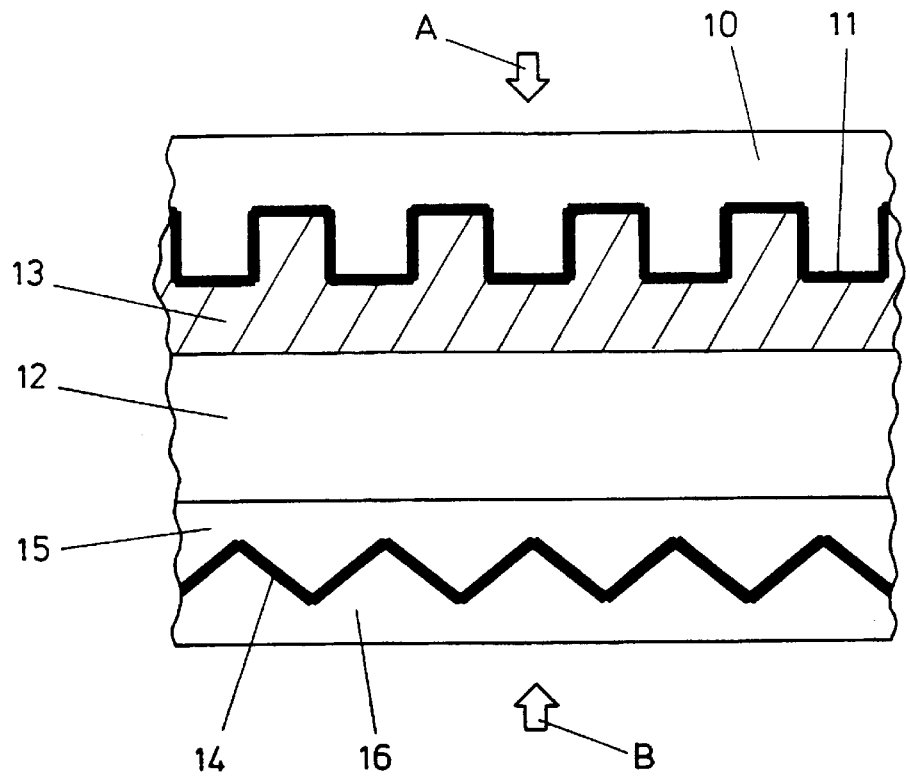
FIG. 3 is a similar view of a third optical data storage disc in accordance with the invention.

FIG. 3 shows an optical data storage disc which differs from that shown in FIG. 2 in that the second component disc 12 is bonded to the first component disc 10 with its patterned coating facing away from the component disc 10. The patterned surface is provided with the reflective coating 14 and then covered with a protective layer 16.

Figure 4:
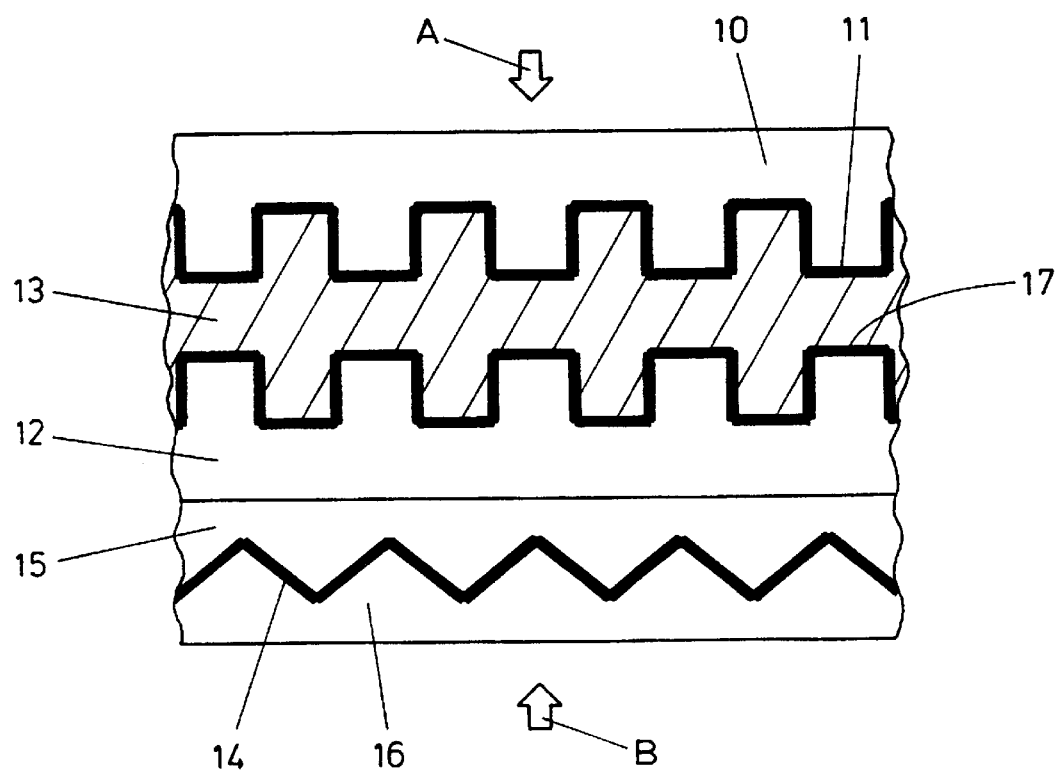
FIG. 4 is a similar view of a fourth optical data storage disc in accordance with the invention.

The optical data storage disc shown in FIG. 4 differs from that shown in FIG. 3 in that the side of the second component disc 12 which faces the first component disc 10 is formed with a pattern of indentations defining digital data, and this side is provided with a reflective coating 17. The two separate digital data patterns are both read from the same side of the disc (indicated by arrow A), whilst the hologram or other optically variable image is visible from the opposite side (indicated by the arrow B).

It will be appreciated that the optical data storage disc of FIG. 1 is of simple construction and simple to manufacture: it has the particular advantage that the two component discs 10,12 are made by injection moulding, and no embossing or other machine is needed to form the surface relief pattern.

The optical data storage disc of FIG. 2 is also of simple construction and simple to manufacture. Although it requires investment in an embossing or other machine to form a surface relief, the overall disc may be less expensive to manufacture than the disc of FIG. 1, because the embossing or alternative procedure may itself be less expensive than producing the secondary disc by injection moulding.

The disc of FIG. 3 provides the further advantage that the surface relief of the component disc 12 is protected either side by respective coatings 15,16 (which are preferably of the same material, or of materials having similar chemical and physical properties): it is therefore not possible for unauthorised persons to expose the surface relief pattern in order to take a cast from it, for making counterfeit copies.

The optical data storage disc of FIG. 4 has all the advantages of the disc of FIG. 3, and also has the advantage of holding nearly double the amount of data.

Figure 5:
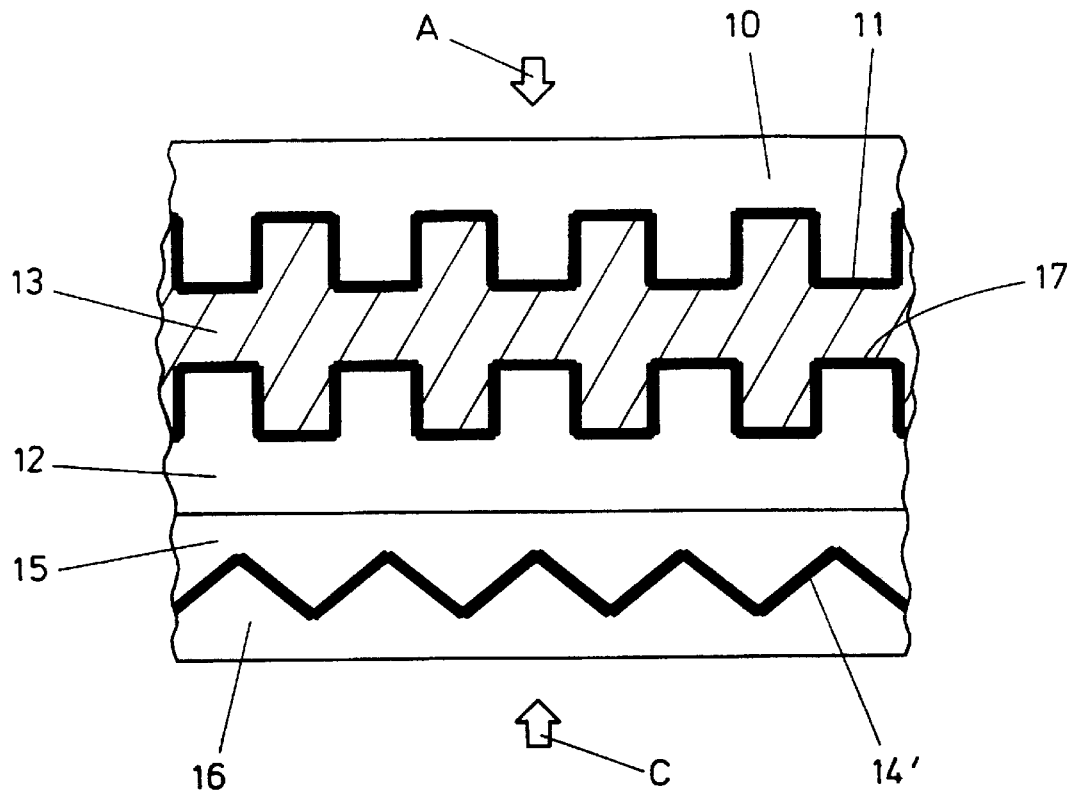
FIG. 5 is a similar view of a fifth optical data storage disc in accordance with the invention.
Figure 6:
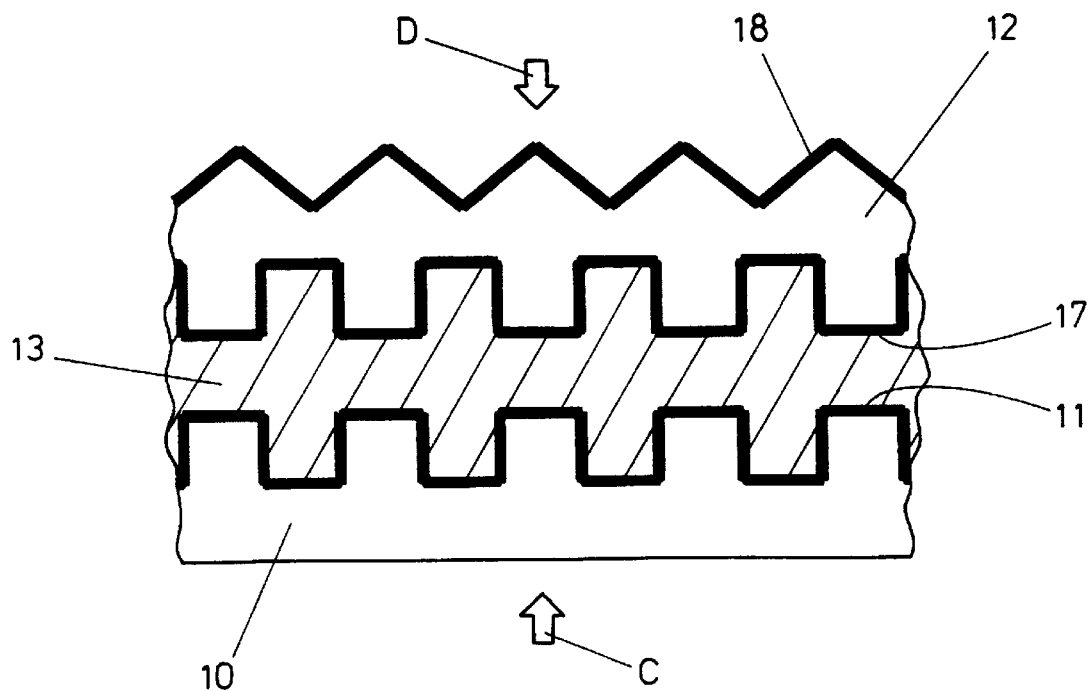
FIG. 6 is a similar view of a sixth optical data storage disc in accordance with the invention.

FIGS. 5 and 6 also show optical data storage discs having two separate digital data patterns, and therefore holding nearly double the amount of data as the discs shown in FIGS. 1 to 3. However, in use of the discs of FIGS. 5 and 6, the two digital data patterns are read from opposite sides of the disc, instead of both being read from the same side. Thus, the disc of FIG. 5 differs from the disc of FIG. 4 in that a semi-reflective, semi-transparent coating 14' is provided over the lacquer coating 15 of the second component disc 12: this enables the digital data pattern of the component disc 12 to be read from the direction indicated by arrow C, and the hologram or other optically variable image (defined by the surface relief with which coating 15 is formed) is also viewed from the latter direction. If necessary, the component disc 10 may be of greater thickness than the disc 12, to compensate for the additional layers 15,16 on the component disc 12, and provide equivalent optical paths in the respective digital data patterns.

In FIG. 6, the two component discs 10,12 are again formed with indentations defining digital data patterns, and provided with reflective coatings 11,17: the two component disc 10,12 are again bonded together by a layer of bonding material 13; the outer surface of the component disc 12 is provided with a surface relief 18 defining a hologram or other optically variable image, and may be either uncoated (as shown) or coated. The component disc 12 is formed by injection moulding, complete with its digital indentations and surface relief: the digital data of disc 12 is read from the corresponding side of the disc, as indicated by arrow D, and the hologram or other optically variable image is viewed from the same side (and is visible without the need to coat the surface relief with reflective or semi-reflective material). The component disc 10 may also be provided with a surface relief on its outer surface, to define a hologram or other optically variable image visible from that side of the disc (indicated by arrow C).

I claim:

1. An optical data storage disc comprising a first component disc formed over one side with a pattern of indentations defining digital data, the indented side of said first component disc being provided with a reflective coating, and a second component disc bonded to said indented side of said first component disc and imparting strength and rigidity to said first component disc, with said second component disc carrying a surface relief pattern having continuous variations in depth over a range of depths and defining a holographic image.

2. An optical data storage disc as claimed in claim 1, wherein said surface relief pattern of said second component disc is provided with a reflective coating.

3. An optical data storage disc as claimed in claim 1 wherein said surface relief pattern of said second component disc is formed directly into that side of the second component disc which faces said first component disc.

4. An optical data storage disc as claimed in claim 1 wherein that said surface relief pattern is formed into the surface of a coating applied to one side of said second component disc.

5. An optical data storage disc as claimed in claim 4, wherein said surface relief pattern is embossed into said coating applied to one side of said second component disc.

6. An optical data storage disc as claimed in claim 4 wherein said coated surface faces towards said first component disc.

7. An optical data storage disc as claimed in claim 4 characterised in that said coated surfaces faces away from said first component disc.

8. An optical data storage disc as claimed in claim 7, said coating is further coated with an outer, protective layer.

9. An optical data storage disc as claimed in claim 1 wherein the side of said second component disc (12) facing said first component disc is formed with a pattern of indentations defining digital data.

10. An optical data storage disc as claimed in claim 9, wherein said digital data patterns of said first and said second component discs are readable from the same side of said disc.

11. An optical data storage disc as claimed in claim 10, wherein said digital data pattern of said first component disc is provided with a semi-reflective coating.

12. An optical data storage disc as claimed in claim 9, wherein said digital data patterns of said first and said second component discs are readable from opposite sides of said disc.

13. An optical data storage disc as claimed in claim 1, wherein an outer surface of at least one of said component discs is formed with a surface relief defining a hologram.

14. An optical data storage disc as claimed in claim 13, wherein the outer surface of said first component disc comprises a coating into which said surface relief is formed and then coated with a semi-reflective layer.

15. An optical data storage disc as claimed in claim 1, wherein said first and second component discs are formed by injection moulding so that said digital data pattern or patterns are moulded therein.

16. An optical data storage disc as claimed in claim 13, wherein the outer surface of said second component disc comprises a coating into which said surface relief is formed and then coated with a semi-reflective layer.

17. An optical data storage disc comprising a first component disc formed over one side with a pattern of indentations defining digital data, the indented side of said first component disc being provided with a reflective coating, and a second component disc bonded to said indented side of said first component disc and imparting strength and rigidity to said first component disc, with said second component disc carrying a surface relief pattern having continuous variations in depth over a range of depths and defining an optically variable image.

18. An optical data storage disc as claimed in claim 17, wherein a side of said second component disc facing said first component disc is formed with a pattern of indentations defining digital data.

19. An optical data storage disc as claimed in claim 18, wherein said digital data patterns of said first component disc and said second component disc are readable from the same side of said disc.

20. An optical data storage disc as claimed in claim 18, wherein said digital data patterns of said first component disc and said second component disc are readable from opposite sides of said disc.

21. An optical data storage disc comprising a first pre-formed component disc formed over one side with a pattern of indentations defining digital data, the indented side of said first pre-formed component disc being provided with a reflective coating, and a second pre-formed component disc being bonded to said indented side of said first pre-formed component disc, with said second pre-formed component disc carrying a surface relief pattern defining an optically variable image and formed over one side with a pattern of indentations defining digital data.

22. An optical data storage disc as claimed in claim 21, wherein said digital data patterns of said first pre-formed component disc and said second pre-formed component disc are readable from the same side of said disc.

23. An optical data storage disc as claimed in claim 21, wherein said digital data patterns of said first pre-formed component disc and said second pre-formed component disc are readable from opposite sides of said disc.

24. An optical data storage disc as claimed in claim 21, wherein said optically variable image is a holographic image.

* * * * *